US006579930B2

(12) United States Patent
Herberger, Sr. et al.

(10) Patent No.: US 6,579,930 B2
(45) Date of Patent: Jun. 17, 2003

(54) TIRE WITH MINIMAL-MARKING TREAD AND SKID STEERING, FIXED AXLE, TIRE/WHEEL OR VEHICULAR TRACK ASSEMBLY WHERE SAID TIRE OR TRACK HAS A MINIMAL-MARKING TREAD

(75) Inventors: James Robert Herberger, Sr., Canal Fulton, OH (US); Lewis Timothy Lukich, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 26 days.

(21) Appl. No.: 09/775,225

(22) Filed: Feb. 1, 2001

(65) Prior Publication Data

US 2002/0140288 A1 Oct. 3, 2002

(51) Int. Cl.[7] .................................................. C08K 3/34
(52) U.S. Cl. ...................... 524/492; 524/493; 152/209.5
(58) Field of Search ................................. 524/492, 493, 524/340, 342, 348, 349, 369, 370

(56) References Cited

U.S. PATENT DOCUMENTS

| 3,400,099 | A | * | 9/1968 | Cook | 260/45.85 |
|---|---|---|---|---|---|
| 3,907,053 | A | | 9/1975 | Savage | 180/6.48 |
| 5,131,731 | A | | 7/1992 | Johnson | 305/56 |
| 5,580,919 | A | | 12/1996 | Agostini et al. | 524/430 |
| 5,905,112 | A | * | 5/1999 | Hellermann | 524/575 |
| 6,008,295 | A | * | 12/1999 | Takeichi et al. | 525/105 |
| 6,025,415 | A | * | 2/2000 | Scholl | 523/213 |
| 6,344,506 | B2 | * | 2/2002 | Vasseur | 524/91 |

FOREIGN PATENT DOCUMENTS

| EP | 0708137 | 10/1995 | C08K/3/36 |
|---|---|---|---|
| EP | 1179560 | 7/2000 | C08K/5/01 |
| WO | 9902590 | 1/1999 | C08K/5/13 |
| WO | 9955541 | 11/1999 | B60C/7/12 |

OTHER PUBLICATIONS

European Search Report.

* cited by examiner

*Primary Examiner*—Edward J. Cain
*Assistant Examiner*—Katarzyna W. Lee
(74) *Attorney, Agent, or Firm*—Henry C. Young, Jr.

(57) ABSTRACT

The present invention relates to tires and vehicular tracks having minimal-marking rubber treads and particularly to skid steering, fixed axle, tire/wheel or track assemblies where said tire or vehicular track has a minimal-marking tread. In particular, such rubber tread has a surface intended to be ground-contacting which is also intended to be minimal-marking and having suitable physical properties for a tire tread.

12 Claims, No Drawings

TIRE WITH MINIMAL-MARKING TREAD AND SKID STEERING, FIXED AXLE, TIRE/WHEEL OR VEHICULAR TRACK ASSEMBLY WHERE SAID TIRE OR TRACK HAS A MINIMAL-MARKING TREAD

FIELD OF THE INVENTION

The present invention relates to tires and vehicular tracks having minimal-marking rubber treads and particularly to skid steering, fixed axle, tire/wheel or track assemblies where said tire or vehicular track has a minimal-marking tread. In particular, such rubber tread has a surface intended to be ground-contacting which is also intended to be minimal-marking and having suitable physical properties for a tire tread.

BACKGROUND OF THE INVENTION

Tires and vehicular tracks are typically provided with rubber treads which contain carbon black reinforcement and also contain rubber staining amine-based antidegradants and sometimes rubber staining aromatic rubber processing oils.

However, sometimes tires and vehicular tracks are provided for vehicles which are intended to be driven over surfaces other than black-colored asphalt pavement, such as for example concrete, for which it is desired that their treads do not leave colored marks, especially black marks, on the surface when the vehicle itself is driven over the surface.

Particular tire treads marking problems are considered herein to be often evident for vehicles which control their direction of travel by what is known as "skid-steering". For such skid-steering phenomenon, the vehicular front wheel, or track, is mounted on a fixed axle which is not allowed to pivot to enable the vehicle to change its direction of travel. In such case, the vehicle is turned by causing one wheel, or track as the case may be, to turn faster, or slower, than its opposite wheel, or track, on the other side of the vehicle. Thus the tread "slides" over the surface with a typical abrading away of a portion of the tread on the surface over which the tread skids.

Accordingly, the treads of such vehicular tires or tracks, as the case may be, which "skid-steer" have a relatively high rate of tread wear and incidence of marking of the surface over which the tread skids, even if the vehicle is a relatively slow moving vehicle.

For example, medium to small vehicles which rely upon skid steering to control their direction of travel may be used to haul rocks and dirt, as well as individuals over various paved road surfaces which may be of rough or smooth non-black colored surfaces (e.g. concrete) where it is desired that the treads to not excessively mark the surfaces with cosmetically unacceptable marks. Such paved surfaces may be, for example, a factory floor or a garage for parking the vehicle as well as a driveway associated with such garage.

Accordingly, it is desired to provide a tire and vehicular track with rubber treads that do not easily leave marks on a non-black substrate, or ground yet still has acceptable physical properties for a tread.

Vehicular tracks, as contemplated herein, are conventionally endless rubber tracks, usually positioned over at least two fixed axle vehicular wheels, normally a drive wheel for engaging an inner surface of the rubber track and driving the track and at least one vehicular driven wheel to aid in guiding the contorted path of the rubber track as it moves around the vehicular wheels to propel the associated vehicle over the ground.

The outer surface of the rubber track, namely its tread, is intended to be ground contacting and typically contains a plurality of raised rubber lugs designed to contact, or engage, the ground.

While it may be readily thought of to provide such a tread without, or with only a minimal amount of carbon black, and with an alternate reinforcing filler such as, for example, amorphous silica, there are other factors to take into consideration for the rubber composition to be resistant to marking of a non-black substrate and to also have appropriate physical properties.

For example, such treads preferably have a balance between good traction and resistance to wear.

It is recognized that it is well known to use various materials, and amounts of various individual materials, for tire treads such as, for example, carbon black reinforcement, amorphous silica (e.g. precipitated silica) reinforcement, rubber processing oil and antidegradants (particularly antioxidants), as well as individual elastomers, for example, cis 1,4-polyisoprene natural and synthetic rubber, cis 1,4-polybutadiene rubber and styrenelbutadiene copolymer rubber.

Indeed for tire and vehicular track treads intended to be non-marking for non-black substrates, it is considered herein that particular considerations should be made. For such purpose, this invention is primarily based upon the use of known materials used in what is considered herein to be novel, material-specific combinations for a tire tread.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise indicate. The terms "cure" and "vulcanize" may be used interchangeably unless otherwise indicated.

SUMMARY AND PRACTICE OF THE INVENTION

In accordance with this invention, a minimal-marking tread intended to be ground-contacting for a tire or vehicular track wherein said tread is of a rubber composition which comprises, based upon 100 parts by weight rubber (phr), (A) 100 parts by weight of at least one conjugated diene-based elastomer, (B) about 35 to about 100, alternately about 40 to about 90, phr of particulate filler comprised of aggregate of synthetic amorphous silica and from about zero to about 7, alternately from one to about 5, and preferably zero, phr of carbon black, (C) about 2 to about 5 phr of a phenolic-based antidegradant to the exclusion of an amine-based antidegradant, (D) about five to about 15 of a paraffinic rubber processing oil which contains less than about 14 weight percent aromatic compound(s) to the exclusion of rubber processing oil containing greater than 15 weight percent of aromatic compounds and (E) at least one coupling agent having a moiety reactive with hydroxyl groups contained on the surface of the said amorphous silica (e.g. silanol groups) and another moiety interactive with at least one of said diene-based elastomers.

Therefore, for the purposes of this invention, the tire, or track, tread rubber compositions do not necessarily have to be devoid of carbon black, and therefore may be of a black color, however, they are to contain only a minimal amount of carbon black, if any amount of carbon black at all. Accordingly, for many applications, it may be desired that the tread rubber compositions do not contain carbon black and are therefore reinforced with silica as described above. With such treads required to contain a relatively quantitative amount of silica and a minimal, if any, amount of carbon black, it is considered herein that it remains to be a challenge to provide such tread rubber compositions which have suitable physical properties for a tire or track tread.

In one aspect of the invention, said tread rubber is desired to be prepared by a sequential mixing process in at least one internal rubber mixer, which comprises, based upon parts by weight per 100 parts by weight rubber (phr)

(A) mixing in at least two sequential preparatory blending steps in at least one internal rubber mixer to a temperature in a range of about 100° C. to about 180° C. a blend of ingredients comprised of, based on 100 parts by weight rubber (phr)

(1) 100 parts by weight of at least one conjugated diene-based elastomer, (2) about 35 to about 100, alternately about 40 to about 90, phr of particulate filler comprised of aggregates of synthetic amorphous silica having hydroxyl groups on its surface and from about zero to about 7, alternately from one to about 5, and preferably zero, phr of carbon black, (3) about 5 to about 15 of a paraffinic rubber processing oil which contains less than about 14 weight percent aromatic compound(s) to the exclusion of rubber processing oil contain greater than 15 weight percent of aromatic compounds and (4) a bis-(3-triethoxysilylpropyl) polysulfide having from 2 to 6, with an average of from 2 to 2.6, connecting sulfur atoms in its polydisulfidic bridge, and (B) mixing the product of said at least two preparatory mixing steps with a conjugated diene-based rubber vulcanizing amount of sulfur and vulcanization accelerator and from about 5 to about 15 phr of bis-(3-triethoxysilylpropyl) polysulfide having from 2 to 6, with an average of from 2 to 2.6, or from 3.5 to 4, connecting sulfur atoms in its polysulfidic bridge, to a temperature in a range of about 110° C. to about 120° C.; wherein a total (sum) of from about 1 to about 5 phr of at least one phenolic antidegradant to the exclusion of an amine-based antidegradant is mixed with said elastomer(s) in at least one of said mixing steps; and wherein said rubber composition is removed from said internal rubber mixer at the conclusion of each mixing stage and cooled to a temperature below 40° C. followed by shaping and sulfur vulcanizing said tread rubber composition.

In further accordance with this invention, a skid steering, fixed axle, assembly as a tire/wheel assembly or a drive wheel/vehicular track assembly is provided where said tire and said vehicular track has the said minimal-marking tread.

Thus such tread rubber composition for said tread is provided as a sulfur vulcanized tire tread rubber composition where the tread is sulfur vulcanized as a part of the respective vehicular tire or vehicular track.

In practice, the drive wheel/vehicular track assembly is comprised of a rubber track positioned over at least two fixed axle vehicular wheels, namely a drive wheel for engaging an inner surface of the rubber track and driving the track and at least one vehicular driven wheel to aid in guiding the contorted path of the rubber track as it moves around the vehicular wheels, including the associated drive wheel, to propel the associated vehicle over the ground.

The outer surface of the rubber track, namely its tread, is intended to be ground contacting and typically contains a plurality of raised rubber lugs designed to contact, or engage, the ground.

It is to be appreciated that the prepared tread rubber composition is appropriately extruded through a suitable extruder die to form a shaped tread stock strip, the tread strip built onto a tire or vehicular track carcass and the resulting assembly is sulfur-vulcanized in a suitable mold usually at a temperature in a range of about 130° C. to about 160° C. for this invention.

A significant aspect of the tread rubber composition for this invention is the use of aggregates of synthetic silica reinforcement in the absence of amine based antidegradants and processing oils with only a minimal amount, if any, of aromaticity and to a substantial exclusion of carbon black reinforcement.

This is considered herein to be important where it is desired to provide a tread for a tire or vehicular track which is minimal-marking, in any, on the ground over which it travels and, also, has good physical properties for use as a tread.

For the purposes of this invention, a minimal-marking tread is a tread that leaves a minimal, in any, visible residue, preferably no visible residue, on a hard substrate surface that can easily be physically brushed away, and does not stain such hard substrate surface, particularly for relatively slow moving skid steering tires, as compared to such treads which contain relatively high levels of carbon black (e.g. 50 to 75 phr of carbon black) and particularly in an amount equivalent to the amount of silica contained in the treads of this invention.

Thus, it is required that the tread rubber composition for this invention contains only minimal amount, if any, particulate carbon black bound to the rubber composition itself which, as the rubber might be abraded away on a hard surface over which the tread travels, little or no carbon black is contained in any residue deposited on such hard surface. Further, the tread rubber composition for this invention is required to be exclusive of rubber processing oils which contain appreciable amounts of aromaticity and exclusive of amine based antidegradants which may otherwise contribute to creating a coloration on various hard substrates over which the tread may travel.

A significant aspect of the method of preparation of the tire tread rubber composition is the split silica coupler addition in which one coupler is added in a preparatory, non-productive, mixing stage and another coupler is added in the subsequent productive mixing stage. This procedural aspect of the invention is considered herein to be important to cause effective binding of the silica in the elastomer host.

The forming of the tread is contemplated to be by conventional means such as, for example, by extrusion of rubber composition to provide a shaped, unvulcanized tread. Such forming of a tread is well known to those having skill in such art.

It is understood that the tire, or vehicular track, as the case may be, as a manufactured article, is prepared by shaping and sulfur curing the assembly of its components at an elevated temperature (e.g. 140° C. to 180° C.) and elevated pressure in a suitable mold. Such practice is well known to those having skill in such art.

The diene-based elastomers for the rubber composition of the tread of the tire and vehicular track of this invention, are, for example, homopolymers and copolymers of at least one conjugated diene such as, for example, isoprene and/or 1,3-butadiene and copolymers of at least one conjugated diene, such as for example, isoprene and/or 1,3-butadiene, and a vinyl aromatic compound such as styrene or alphamethyl styrene, preferably styrene. It is required that such elastomers contain non-staining antidegradants and therefore are exclusive of amine-based antidegradants.

Representative of such diene-based elastomers are, for example, elastomers comprised of cis 1,4-polyisoprene (natural and synthetic), cis 1,4-polybutadiene, high vinyl polybutadiene having a vinyl 1,2-content in a range of about 35 to about 90 percent, isoprene/butadiene copolymer elastomers, styrene/butadiene copolymer elastomers (organic solvent solution polymerization formed or prepared and aqueous emulsion polymerization formed or prepared) and styrene/isoprene/butadiene terpolymer elastomers.

Synthetic amorphous silicas are usually aggregates of precipitated silicas for use in this invention although they may be fumed silicas or even co-fumed silica and carbon black. Precipitated silicas are, for example, those obtained by the acidification of a soluble silicate, e.g., sodium silicate, including blends of a sodium silicate and aluminate. Such precipitated silicas are well known to those having skill in such art.

Such amorphous, particularly precipitated, silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 100 to about 400, and more usually about 150 to about 300.

The silica is conventionally used in conjunction with a silica coupler as hereinbefore discussed to couple the silica to at least one of said diene-based elastomers and, thus, enhance the elastomer reinforcing effect of the silica.

It is readily understood by those having skill in the art that the rubber composition would be compounded by methods generally known in the rubber compounding art, such as mixing the various sulfur-vulcanizable constituent rubbers with various commonly used additive materials, as herein before discussed, as known to those skilled in the art, depending on the intended use of the sulfur vulcanizable and sulfur vulcanized material (rubbers), the various additives, unless otherwise indicated, are selected and commonly used in conventional amounts.

Representative of phenolic antidegradants for use in this invention are, for example, antioxidants such as polymeric hindered phenols from The Goodyear Tire & Rubber Company and Exxon Mobil, including phenolic antidegradants disclosed in The *Vanderbilt Rubber Handbook* (1978), Pages 344 through 346.

Representative non-aromatic rubber processing oils for use in this invention, namely such oils which contain less than 14 percent weight aromatic compounds, if at all, are, for example, Flexon 641 from Exxon Mobile.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, a polymeric polysulfide. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

In one aspect of the invention, it is desired to provide a sulfur vulcanized (cured) silica reinforced diene-based rubber compositions which can have the following combination of threshold physical properties for use in treads of this invention which might be referred to herein as "Target Properties". Such properties are represented in the following Table A:

TABLE A

| Target Properties | Values |
| --- | --- |
| Modulus, 300%, MPa | at least 6, and in a range of 6 to 13 |
| Rebound at 100° C. (%) | at least 50, and in a range of 50 to 68 |
| Hardness, Shore A (100° C.) | at least 52, and in a range of 52 to 70 |
| Abrasion, DIN (cm$^3$ loss) | Maximum of 85 where lower is better |
| Molded groove tear resistance, N | at least 15, where higher is better |

These Target Properties are considered significant because they relate to desired physical properties, particularly for predicting suitable tire tread performance for the tires desired for this invention.

In particular, a 300 percent modulus (ASTM Test D412, ring tensile method) of greater than 6 MPa (a range of 6 to 13 MPa) is important because it is considered herein to relate to better (less) abrasion and better handling characteristics. A Rebound value (ASTM D1054) at 100° C. of at least 50 percent (a range of 50 to 68 percent) is important because it is considered herein to relate to better (reduced) tire heat build-up and rolling resistance characteristics.

A Shore A hardness value (ASTM D2240) at 100° C. of at least 52 (a range of 52 to 70) is important because it is considered herein to relate to better tire handling and greater abrasion resistance (less wear) characteristics. A DIN abrasion loss (ASTM D5963, using 10 Newtons force) of a maximum of 85 cm$^3$ volume loss is important because it is considered herein to relate to a better (reduced) treadwear characteristic.

The molded groove tear resistance (average molded groove tear strength) value (ASTM D624) of at least 15 Newtons is considered herein to be important as relating to damage resistance where a higher value is indicative of greater resistance to damage.

In practice the median molded groove tear strength of vulcanized rubber is measured according to ASTMD624 in which a rectangularly shaped cured rubber samples is obtained having a groove along its longitudinally central axis which basically divides the sample into two halves, namely one half on each side of the center of the groove. The test sample dimension is 2.54 cm wide, 12.7 cm long and 0.64 cm thick. The molded groove has an arc configuration of 14 degrees with a depth of 0.086 cm and a top groove width of 0.084 cm. The test is conducted by measuring the force, in Newtons, to initiate and propagate a tear along the groove in which the halves of the sample, at one end of the sample, are pulled apart at 180° C. angle at a crosshead speed of about 51 cm per minute at about 23° C.

In practice, while it is considered herein that the above-referenced rubber composition target properties are individually significant for relating to specifically desired tire characteristics, it is a desirable feature of this invention that all of the above target properties are obtained for a rubber composition by the practice of this invention.

The invention may be better understood by reference to the following examples in which the parts and percentages are by weight unless otherwise indicated.

EXAMPLE I

In this Example, the rubber compositions shown in Table 1 were prepared in an internal rubber mixer. Sample A is a Control Sample wherein an aromatic rubber processing oil, staining amine-based antioxidant, carbon black reinforcement and an elastomer blend of natural cis 1,4-polyisoprene rubber and styrene/butadiene copolymer rubber is used.

Sample B contains only 1 phr of carbon black which is inherently present in the carbon black/coupling agent composite (Degussa X50S) as a carrier for the otherwise liquid bis(3-triethoxysilylpropyl) tetrasulfide silane coupler. In practice, it is actually preferred not to use any carbon black in the tread rubber composition so that therefore, an addition of the coupling agent in its liquid form, or as a composite thereof with a non-carbon black carrier (e.g. silica carrier) is preferred.

Sample B contains paraffinic rubber processing oil, non-staining phenolic antioxidant, precipitated silica reinforcement, dual coupling agents, and, as discussed above, only a minimal amount of carbon black contained in a silica coupler composite, and an elastomer blend of natural cis 1,4-polyisoprene and cis 1,4-polybutadiene copolymer rubber (containing a non-staining antidegradant exclusive of amine-based antidegradants).

Ingredients for Samples are shown in the following Table 1. The ingredients were first mixed in a preliminary non-productive mixing step (without the sulfur and accelerator curatives) for about 3.5 minutes to a temperature of about 165° C.

In a subsequent productive mixing step, sulfur and accelerator were added in which the mixing step was conducted for about 1.5 minutes to a temperature of about 110° C. After each mixing step, the mixture was allowed to cool to below 40° C., usually after a short open mill mixing.

The overall mixing procedure involving one or more non-productive mixing steps at a higher temperature followed by a productive mixing step for the sulfur and accelerator at a lower temperature is well known to those having skill in such art.

Table 1 illustrates the ingredients used for preparing the rubber compositions of Samples A and B.

TABLE 1

|  | Control Sample A | Sample B |
| --- | --- | --- |
| First Non-Productive Mixing Step |  |  |
| Natural rubber[1] | 0 | 50 |
| Styrene/butadiene rubber[2] | 68.75 | 0 |
| Cis 1,4-polybutadiene rubber[3] | 0 | 50 |
| Carbon black[4] | 47 | 0 |
| Silica[5] | 0 | 50 |
| Coupling agent[6] | 0 | 4 |
| Aromatic processing oil[7] | 15 | 0 |
| Paraffinic processing oil[8] | 0 | 14 |
| Wax[9] | 3.8 | 1.5 |
| Zinc oxide | 3.5 | 3 |
| Fatty acid[10] | 2 | 2 |
| Second Non-Productive Mixing Step |  |  |
| Cis 1,4-polybutadiene rubber[11] | 62.5 | 0 |
| Carbon black[4] | 25 | 0 |
| Silica[5] | 0 | 15 |
| Aromatic processing oil[7] | 1.5 | 0 |
| Paraffinic processing oil[8] | 0 | 4 |
| Coupling agent[6] | 0 | 1.2 |
| Productive Mixing Step |  |  |
| Sulfenamide accelerator(s) | 1.8 | 1.7 |
| Secondary accelerator(s)[12] | 0.65 | 2 |
| Sulfur | 1.25 | 2 |
| Coupling agent composite, (50% carbon black)[13] | 0 | 2 |
| Antidegradant(s)[14] | 2.4 | 0 |
| Antidegradant(s)[15] | 0 | 3 |

[1]Natural cis 1,4-polyisoprene rubber
[2]Obtained as PLF1712C from The Goodyear Tire & Rubber Company
[3]Obtained as BUD1208 from The Goodyear Tire & Rubber Company
[4]N299 carbon black, an ASTM designation
[5]Obtained as Zeopol 8745 from J. M. Huber Company
[6]Obtained as Si266 from Degussa as a liquid bis-(3-triethoxysilylpropyl) disulfide
[7]An aromatic rubber processing oil was used as Sunflex 8125 from the Sun Oil Company having an aromatic content of 40 to 41 percent
[8]A paraffinic rubber processing oil was used as Flexon 641 from the Exxon Mobil Company having an aromatic content of 11 to 14 percent
[9]Microcrystalline/paraffinic mixture
[10]Primarily stearic acid
[11]Obtained as BUDENE-1254 from The Goodyear Tire & Rubber Company
[12]Guanidine type secondary activator from the Flexsys Company
[13]Obtained as X50S from Degussa as a 50/50 composite of bis-(3-triethoxysilylpropyl) tetrasulfide and carbon black and, thus, is 50 percent active as a coupling agent
[14]Amine-based antioxidant as Santoflex 6PPD from the Flexsys Company
[15]Phenolic antioxidant as Wingstay L-HLS from The Goodyear Tire & Rubber Company The rubber compositions of Table I were cured for about 55 minutes at about 165° C. Various resulting physical properties are shown in the following Table 2.

TABLE 2

|  | Control Sample A | Sample B |
| --- | --- | --- |
| Marking test[1] | 100 | 5 |
| M. D. Rheometer, 150° C. |  |  |
| Maximum torque (dNm) | 11.7 | 17.4 |
| Minimum torque (dNm) | 2.2 | 2.3 |
| Delta torque (dNm) | 9.5 | 15.1 |
| $T_{90}$ | 9.7 | 4.6 |
| Stress-strain |  |  |
| Tensile strength (MPa) | 12.7 | 15.4 |
| Elongation at break (%) | 661 | 520 |
| 100% modulus (MPa) | 1.1 | 1.7 |
| 300% modulus (MPa) | 4.3 | 7.8 |

TABLE 2-continued

|  | Control Sample A | Sample B |
|---|---|---|
| Rebound, 100° C. (%) | 45.3 | 53.2 |
| Hardness, Shore A, 100° C. (Conical Shear) RPA | 45.2 | 55.8 |
| G' @ 1% strain, 1 Hz, 100° C. (kPa) | 1344 | 2083 |
| G' @ 50% strain, 1 Hz, 100° C. (kPa) | 481 | 605 |
| Tan delta @ 10% strain, 1 Hz 100° C. | 0.204 | 0.174 |
| Molded Groove Tear (N) | 30.6 | 23.6 |
| Abrasion, DIN (cm³ loss) | 85 | 72 |

[1]The marking test is a visual subjective test that was conducted by physically dragging, or rubbing, the DIN Abrasion samples across a non-black hard surface.

The worn surface of the test samples resulting from the DIN abrasion test were used with the visual observation of the Control Sample being normalized to a value of 100. Use of the worn samples is considered herein to be more realistic for such purpose. It is seen from Table 2 that Sample B has 95 percent less marking than the Control Sample. This is considered herein to be important because it validates relatively non-marking characteristics of the Sample B.

It is also seen from Table 2 that 300% modulus, dynamic stiffness (G'), hardness and maximum torque are considerably higher as well as resistance to abrasion (less cm³ loss) for Sample B as compared to Control Sample A. This is also considered herein to be important because the net effect is indicative of better wear durability for the silica reinforced Sample B as compared to the carbon black reinforced Control Sample A.

EXAMPLE II

Pneumatic tires of size 12–16.5 were prepared with treads of rubber compositions represented by Samples A and B of Example I and identified herein as Tires A and B with Tire A being a control and Tire B representing a tire with a tread rubber of this invention. In particular, the tires were mounted on rigid rims (tire/wheel assemblies) and inflated to a proper inflation pressure and front and rear tire/wheel assemblies thereof mounted on axles of a skid steer vehicle.

The tires were driven and skid steered over a hard surface (substrate) of concrete.

Results of the testing are reported in the following Table 3 in terms of resistance to treadwear (durability) and whether the treads tended to leave markings on the concrete surface due to the skid steering of the vehicle.

TABLE 3

| Tire Tread | Wear Rate[1] | | Marking of the Concrete Surface |
|---|---|---|---|
|  | Front | Rear |  |
| Tread A (Control) | 4.4 | 3.9 | Yes[2] |
| Tread B | 5.9 | 5.9 | Minimal[3] |

[1]Time expressed in hours for a wearing away of 1/32 inch (0.8 mm) of tread depth
[2]Observable heavy black, difficult to remove, tread marks on the concrete surface
[3]Minimal, easily brushed away, residue on the concrete surface It is seen form the data reported in Table 3 that the tread of this invention (Tread B) exhibited excellent resistance to wear and caused only a minimal marking on the concrete surface, as a result of skid steering of the vehicle, as compared to the Control A surface.

While various embodiments are disclosed herein for practicing the invention, it will be apparent to those skilled in this art that various changes and modifications may be made therein without departing from the spirit or scope of the invention.

What is claimed is:

1. A minimal-marking tread, intended to be ground-contacting, for a tire or vehicular track, wherein said tread is of a rubber composition which comprises, based upon 100 parts by weight rubber (phr),
   (A) 100 parts by weight of at least one conjugated diene-based elastomer,
   (B) about 35 to about 100 phr of particulate filler comprised, of aggregate of synthetic amorphous silica and from zero to about 7 phr of carbon black,
   (C) about 2 to about 5 phr of a phenolic-based anti-degradant to the exclusion of an amine-containing antidegradant,
   (D) about five to about 15 of a paraffinic rubber processing oil which contains less than about 14 weight percent aromatic compound(s) to the exclusion of rubber processing oil containing greater than 15 weight percent of aromatic compounds and
   (E) coupling agents having a moiety reactive with hydroxyl groups contained on the surface of the said amorphous silica and another moiety interactive with at least one of said diene-based elastomers, wherein said coupling agents are comprised of:
      (1) bis(3-triethoxysilylpropyl) polysulfide having an average of from 2 to 2.6 connecting sulfur atoms in its polysulfidic bridge, and
      (2) bis(3-triethoxysilylpropyl) polysulfide having an average of from 3.5 to 4 connecting sulfur atoms in its polysulfidic bridge.

2. The tread of claim 1 wherein said tread is a rubber composition prepared by a sequential mixing process in at least one internal rubber mixer, which comprises, based upon parts by weight per 100 parts by weight rubber (phr)
   (A) mixing in at least two sequential preparatory blending steps in at least one internal rubber mixer to a temperature in a range of about 100° C. to about 180° C. a blend of ingredients comprised of, based on 100 parts by weight rubber (phr)
      (1) 100 parts by weight of at least one conjugated diene-based elastomer,
      (2) about 35 to about 100 phr of particulate filler comprised of aggregates of synthetic amorphous silica having hydroxyl groups on its surface and from zero to about 7 phr of carbon black,
      (3) about 5 to about 15 of a paraffinic rubber processing oil which contains less than about 14 weight percent aromatic compound(s) to the exclusion of rubber processing oil contain greater than 15 weight percent of aromatic compounds and
      (4) a bis-(3-triethoxysilylpropyl) polysulfide having from 2 to 6, with an average of from 2 to 2.6, connecting sulfur atoms in its polysulfidic bridge, and
   (B) mixing the product of said at least two preparatory mixing steps with a conjugated diene-based rubber vulcanizing amount of sulfur and vulcanization accelerator and from about 5 to about 15 phr of bis-(3-triethoxysilylpropyl) polysulfide having from 2 to 6, with an average of from 3.5 to 4, connecting sulfur atoms in its polysulfidic bridge, to a temperature in a range of about 110° C. to about 120° C.; wherein a total of from about 1 to about 5 phr of at least one phenolic antidegradant to the exclusion of an amine-containing antidegradant is mixed with said elastomer(s) in at least one of said mixing steps; and wherein said rubber composition is removed from said internal rubber mixer at the conclusion of each mixing stage and cooled to a temperature below 40° C.; and followed by shaping and sulfur vulcanizing said tread rubber composition.

3. The tread of claim 1 wherein said tread is sulfur cured and has a 300 percent Modulus in a range of about 7.5 to about 14 MPa, a Rebound value (100° C.) in a range of about 52 to about 70, a Shore A Hardness (100° C.) in a range of about 54 to about 72, Abrasion resistance (DIN), 10 Newtons force of a maximum of 62 cm³, a G' value at 100° C. and one percent strain in a range of about 2000 to about 3000 Mpa and a Molded groove tear resistance of at least 35 N-cm.

4. The tread of claim 2 wherein said tread is sulfur cured and has a 300 percent Modulus in a range of about 7.5 to about 14 MPa, a Rebound value (100° C.) in a range of about 52 to about 70, a Shore A Hardness (100° C.) in a range of about 54 to about 72, Abrasion resistance (DIN), 10 Newtons force of a maximum of 62 cm³, a G' value at 100° C. and one percent strain in a range of about 2000 to about 3000 MPa and a Molded groove tear resistance of at least 35 N-cm.

5. The tread of claim 1 wherein said bis(3-triethoxysilylpropyl) polysulfide coupling agent having an average of from 2 to 2.6 connecting sulfur atoms in its polysulfidic bridge is blended, in the absence of sulfur and vulcanization accelerator(s), with said tread rubber composition.

6. The tread of claim 5 wherein said bis(3-triethoxysilylpropyl) polysulfide coupling agent having an average of from 3.5 to 4 connecting sulfur atoms in its polysulfidic bridge, is blended, together with sulfur and vulcanization accelerator(s), with the product of blending said tread rubber composition with said bis(3-triethoxysilylpropyl) polysulfide coupling agent having an average of from 2 to 2.6 connecting sulfur atoms in its polysulfidic bridge.

7. The tread of claim 1 wherein said particulate filler consists of said synthetic amorphous silica.

8. The tread of claim 1 wherein said particulate filler consists of said synthetic amorphous silica; wherein said bis(3-triethoxysilylpropyl) polysulfide coupling agent having an average of from 2 to 2.6 connecting sulfur atoms in its polysulfidic bridge is blended, in the absence of sulfur and vulcanization accelerator(s), with said tread rubber composition which contains said carbon black and synthetic amorphous silica; wherein said bis(3-triethoxysilylpropyl) polysulfide coupling agent having an average of from 3.5 to 4 connecting sulfur atoms in its polysulfidic bridge, is blended, together with sulfur and vulcanization accelerator (s), with the product of blending said tread rubber composition, which contains said carbon black and amorphous silica, with said bis(3-triethoxysilylpropyl) polysulfide coupling agent having an average of from 2 to 2.6 connecting sulfur atoms in its polysulfidic bridge.

9. The tread of claim 6 wherein said tread is a tire tread.

10. The tread of claim 8 wherein said tread is a tire tread.

11. The tread of claim 6 wherein said tread is a vehicular track tread.

12. The tread of claim 8 wherein said tread is a vehicular track tread.

* * * * *